US007229019B2

United States Patent
Bock

(10) Patent No.: US 7,229,019 B2
(45) Date of Patent: Jun. 12, 2007

(54) METHOD AND SYSTEM FOR DETERMINING POSITIONS ON A DOCUMENT

(75) Inventor: Wolfgang Bock, Munich (DE)

(73) Assignee: Anitra Medienprojekte GmbH, Munich (DE)

( * ) Notice: Subject to any disclaimer, the term of this patent is extended or adjusted under 35 U.S.C. 154(b) by 271 days.

(21) Appl. No.: 10/940,229

(22) Filed: Sep. 14, 2004

(65) Prior Publication Data

US 2005/0040246 A1 Feb. 24, 2005

Related U.S. Application Data

(63) Continuation of application No. 09/937,048, filed as application No. PCT/EP00/02586 on Mar. 23, 2000, now Pat. No. 6,903,726.

(30) Foreign Application Priority Data

Mar. 24, 1999 (DE) ................................ 199 13 343
May 11, 1999 (DE) ................................ 199 21 778

(51) Int. Cl.
*G06K 7/10* (2006.01)
(52) U.S. Cl. .................. 235/454; 235/494; 235/472.01
(58) Field of Classification Search ................ 235/454, 235/494, 472.01, 462.09, 462.11
See application file for complete search history.

(56) References Cited

U.S. PATENT DOCUMENTS

| | | | |
|---|---|---|---|
| 4,686,329 A | 8/1987 | Joyce | |
| 5,204,515 A | 4/1993 | Yoshida | |
| 5,416,312 A | 5/1995 | Lamoure | |
| 5,442,147 A * | 8/1995 | Burns et al. ............. | 178/18.09 |
| 5,591,956 A | 1/1997 | Longacre et al. | |
| 6,360,948 B1 | 3/2002 | Yang et al. | |
| 6,502,756 B1 * | 1/2003 | Fåhraeus ................... | 235/494 |
| 6,734,442 B1 * | 5/2004 | Hause et al. ............. | 250/491.1 |

* cited by examiner

*Primary Examiner*—Daniel Stcyr
*Assistant Examiner*—Daniel A. Hess
(74) *Attorney, Agent, or Firm*—Frost Todd Brown LLC

(57) ABSTRACT

The invention comprises an information carrier on which the position of a measuring point (37, 41) may be determined using a mobile readout device, as well as an attendant method of determining a position wherein the information carrier features a surface onto which a visible primary information has been applied, in the manner of a book or a geographic map, wherein at least one machine-readable pattern has been printed on the surface, said pattern coding a position information, which upon bringing to bear methods of image analysis and of local sampling of parts (36, 40) of the surface, will allow a determination of position for a measurement point (37, 41) and wherein the pattern coding the position information is transparent in such a way that the primary information on the surface remains visible.

22 Claims, 7 Drawing Sheets

METHOD AND SYSTEM FOR DETERMINING POSITIONS ON A DOCUMENT

This application is a continuation of U.S. application Ser. No. 09/937,048 filed Sep. 20, 2001 now U.S. Pat. No. 6,903,726 which is a national stage of PCT/EP00/02586, filed Mar. 23, 2000.

The invention comprises an information carrier, a method for determining the position of a measurement point on the surface of the information carrier, and a reading device for use in such a method; wherein a program process attached to said position may be called. Furthermore the invention comprises processes for printing patterns onto paper and other surfaces of a carrier, wherein said patterns allow an absolute position measurement to be made on said paper or surfaces. The position may be found relative to the surface that has been sampled; or relative to an arbitrarily larger carrier, wherein the surface that is being sampled is only a part of that carrier.

1. STATE OF THE ART

1.1 Transparent Barcodes and Other Patterns

Visible and invisible barcodes have been described as prior art. E.g. it is possible, using fluorescent inks (so-called security inks) to print an invisible barcode that becomes visible and readable only under UV illumination. DE 196 12 406 C2 describes the use of such a method for "static electronic footnotes", i.e. wherein, before printing onto the information carrier one must decide whether or not to attach auxiliary information to a certain location. The invention eliminates this latter limitation, and it moreover allows, in a way that is relevant to certain applications (architectural plans, maps), a determination of distance on the printed surface, by merely sampling it in two locations.

1.2 General Methods for Determining a Position

The Prior Art Describes
a) so-called optical mice, which image the structure of the surface upon which they lie, and measure relative movement, using methods from image analysis. However, these do not measure absolute position and moreover, they do not relate the measured position to said surface, but rather, to a separate display; thus, the user is not determining position of the cursor in absolute terms, but rather relative to a virtual, purely electronic artwork.
b) graphic tablets, where paper artwork is laid upon an electronic apparatus that implements a reference coordinate system, so that the position of a measurement pen can be determined through the paper.
c) positional measurement tables providing a fixed-frame-of-reference apparatus generating a signal which allows determination of the three-dimensional position of measuring pen, so that in situations where the geometry and position of an object are known, the position of a pen on its two-dimensional surface can be determined. Optical pens can also be categorized in this class, where said frame of reference, in relation to the analysis of a CRT image, is provided by the computer monitor.
d) methods that optically measure a pattern applied on a surface in order to determine the position of said pattern so that, where the shape of the surface is known, the position of the reading device in relation to that surface may be calculated. Such a method has been disclosed in DE 197 28 513 A1 and in a more specialized variant, DE 3427 067 A1 finds the position of a measuring rod in relation to a—preferably optical—reading device.

2. THE INVENTION

The description of the invention is prefaced by some definitions.

In what follows, primary information denotes a visual representation of information, preferably realized by printing ink, and intended for visual use by the unaided eye, in the manner of sheet music, a book, a newspaper, a geographic or architectural map. Information carrier denotes the substrate used for printing.

Barcode denotes any machine-readable e.g. two-dimensional printed pattern, and more specially those commonly known in trade and industry as "one-dimensional" codes, meaning that they can be read along one dimension only, using a point detector or a line raster.

Patterns are preferably realized by printing; they code a position information and may overlap with the primary information. In particular, patterns may be formed by special barcodes.

Said patterns, including those for the primary information, overlap if one of them is applied, entirely or partially, under or over the other; this may be achieved by applying the corresponding inks under or over each other, or side by side (as in two interleaved offset printing rasters).

Unless expressly specified otherwise, the term transparent, when applied to a printed pattern, means that said pattern is either wholly invisible to the naked eye, or at least sufficiently transparent or translucid so as to allow unimpeded use, by the naked eye, of the primary information.

A program process denotes a sequence of logical steps, preferably realized in a computer, controller, or the like, particularly when said sequence makes data available to user; including the exhibition of such data, preferably by acoustic or visual means.

2.0 Description of the Invention

The invention achieves this goal through an information carrier according to claim 61, a position measurement method according to claim 75, and a reading device according to claim 82. Further preferred embodiments of the invention are described in respective attached claims.

The invention therefore involves applying, on the surface of a support, particularly an information support that optionally may already have a "primary information" printed on its surface—e.g. as in sheet music, a book or a map—one or more patterns which locally encode the position of selected, locally recognizable, and in particulars geometric characteristic features: e.g. as a bar code or using similar two-dimensional information representations; wherein, preferably, program processes corresponding to said position may be called. Moreover, a program process can be assigned to an arbitrary position even after the surface has been produced and without subsequent reworking of it.

Said "characteristic feature" can be a corner of a pattern. Generally, it is defined as a point or set of points M, such that M can firstly be found with image analysis methods, and a positional description can be derived for M; and secondly, such that it is possible, preferably for every measurement point K on the surface, to specify a vector KP connecting point K to another point P, whose position may be extracted by an algorithm extracting the information embedded in M. In theory, that vector can be of arbitrary length. In practice, it should be so short as to allow a purely local image analysis of the artwork. M could therefore e.g. be realized as
- a rectangle or a circle (P is then the center of that rectangle or circle) or
- a line segment (a straight line starting at K and perpendicular to the straight line defined by that segment, crossing the latter at the "drop point" P).

The method therefore determines the absolute position of P in a first step, and the vector KP in a second step and, by implication, it finds the position of K.

Said surfaces may be rigid, as in a child's book made from wood panels or strong cardboard. Preferably, the surfaces are compliant, as in a paper page or a foil. In principle it is possible to determine the shape of such a surface within an adequately short span of time, especially when taking advantage of special and additional marks ("adequately short" means that, in that time interval, the surface undergoes no significant change in shape) and—with substantial extra effort—to measure the patterns applied to that surface by optical means or even by physical contact, in that short time span. Such methods are, however, unsuited to the intended mass market applications.

Another feature of the invention, therefore, involves letting the compliant surface have a well-defined contact with a certain part of the reading device, preferably using electrostatic or pneumatic methods and preferably in such a fashion that the partial surface delimited by said part of the reading device is approximately plane. The surface should then be pressed against the sampling head only during sampling, in order to minimize mechanical stress.

In a preferred simple variant, the surface is pressed down around the pixel or line being sampled by the reading device, into an approximately plane shape. In a further preferred embodiment, while the reading device moves, air may be blown through suitable holes, between the reading device and the surface.

In a further preferred embodiment, the surface—e.g. part of a map or a book page—may be vacuumed in, or attracted to the reading device in such a fashion that by virtue of its residual stiffness, the surface will lie in a plane shape on the reading device. While the reading device moves, air may be blown in through suitable vents and vacuuming or attracting action may occur only during the sampling pass.

The claimant reserves the right to file partial claims covering certain additional aspects of the invention as disclosed herein.

2.1 DESCRIPTION OF EMBODIMENTS, ADVANTAGES

Further advantages and elaborations of—the invention can be seen from the following description of preferred embodiments. The description refers to the attached schematic drawings.

2.1.1 DESCRIPTION OF EXAMPLES

The position is determined by a suitable reading device. The "measuring point" K by definition corresponds to a physical location on the reading device; e.g. (15) corresponds to the edge of a line detector, and the points (37), (41), (3) correspond to the center of a two-dimensional sensor raster.

Figure 1:
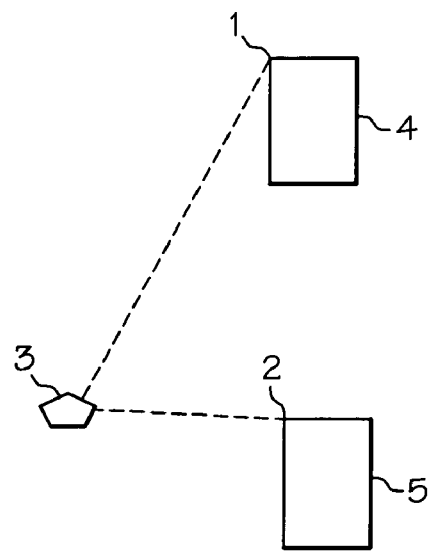
FIG. 1 illustrates an abstracted representation of an information carrier, or printed surface that is suited to the position determination method inherent in the invention.
Figure 7:
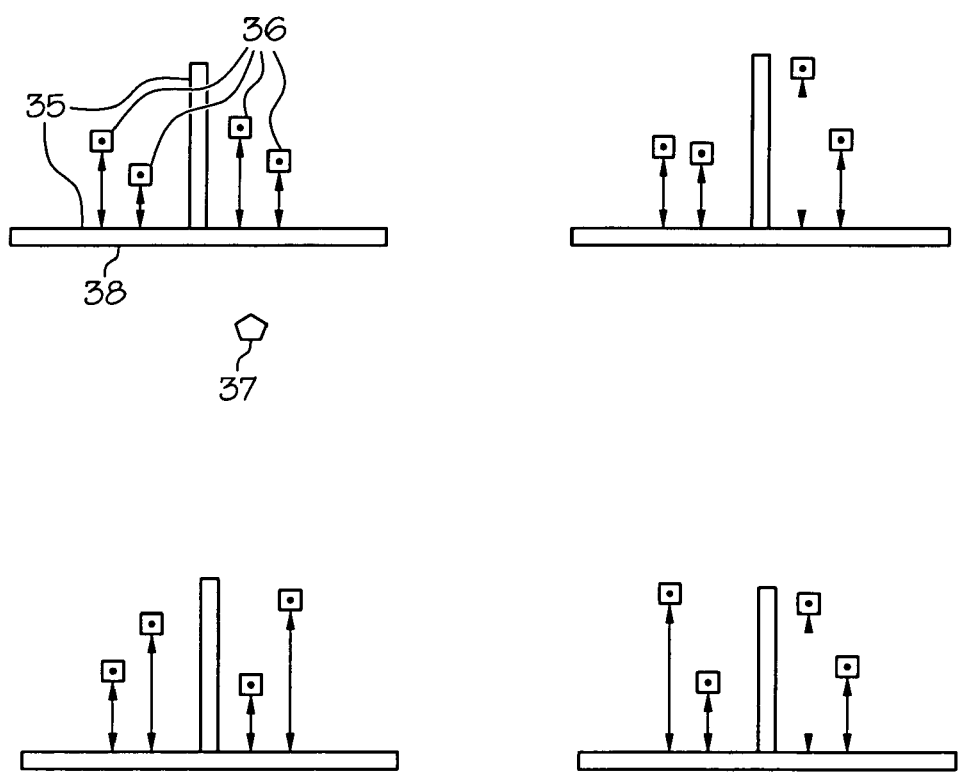
FIG. 7 illustrates an example using one single pattern (lattice of crosshair patterns, with one cluster of points per pattern, respectively, encoding absolute position information).
Figure 8:
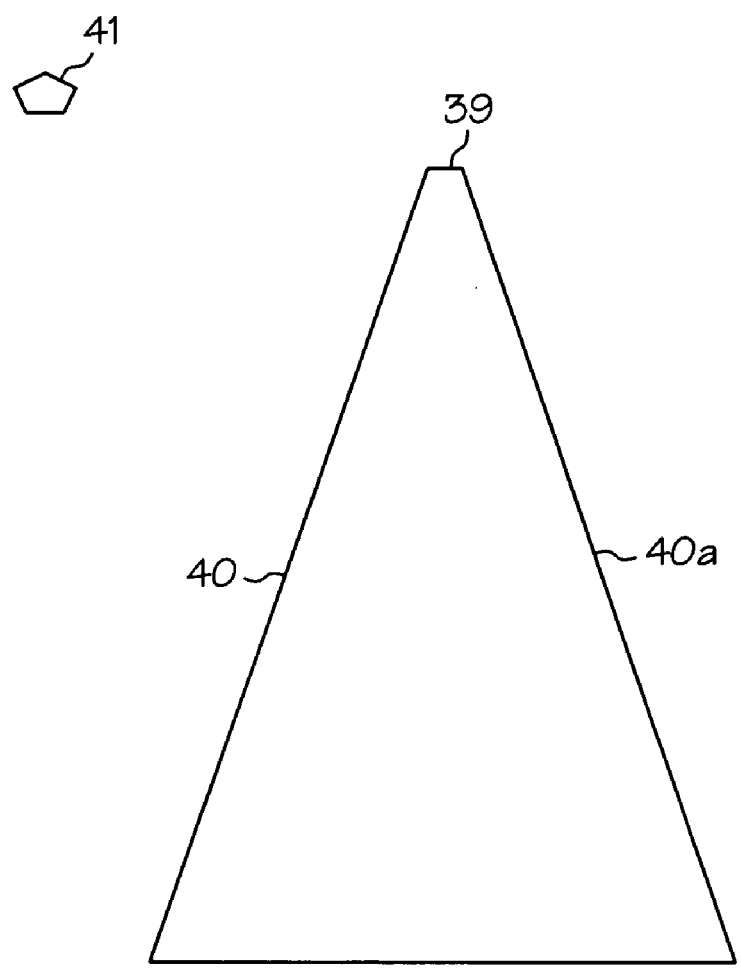
FIG. 8 illustrates an example using one single pattern (lattice of triangles) with perimeter recognizable by the reading device and local encoding of absolute position using pixel raster with pixels colored in shades of gray.

The determination of position is preferably achieved by a first logical step which finds, for one of the specified patterns on a carrier, e.g. an information carrier, its respective characteristic feature and the corresponding point P; for example, in FIG. 1 the characteristic feature is assumed to be, for pattern (4), the uppermost left corner (1); in FIG. 7 for each (local) pattern consisting of a crosshair and point cluster (35), (36), it is assumed to be the crossing (38) of the hairs; in FIG. 8, for the triangle (40*a*), (40) it is assumed to be the top corner (39).

In a second step; the vector KP will then be determined as a pair of signed relative coordinates of the measurement point relative to one of the above characteristic features; in FIGS. 1, 7, and 8 points K and P are respectively: (3) and (1); (37) and (38); (41) and (39).

In a third step, a local decoding of exactly those patterns determines the absolute coordinates of point P on the surface. Using the information from the first two steps, the absolute position of measurement point K (37), (41) or (3) can be found.

It follows that a position measurement for two such points (or where the angle of the sensor is known in the case of one single measuring point) will determine the two-dimensional position of the reading device on the surface and in particular, therefore, the position of a crosshair attached to that reading device.

The above measurement method can e.g. be realized using classical raster-oriented image analysis, since the latter allows one to:
- recognize, in a two-dimensional area representation that is extracted by optical or other sensing, a characteristic geometrical feature such as the corner or the edge of a pattern, and to assign to it a point P with a defined position in the above pixel raster
- measure signed distances between measurement point K to point P, again on the above pixel raster derive the absolute position of P from a localized image analysis procedure performed on the pattern Therefore, preferably, one single pass suffices to realize those three steps.

Preferably, such patterns may be applied onto the surface being sampled
- during production of the surface: e.g. by applying, in addition to classical color inks, suitable additional special inks (e.g. in offset printing, or using additional inks in an inkjet printer), or
- afterwards: wherein such patterns are printed or stamped onto a piece of existing printed page or a surface—e.g. onto a building plan or a map.

The image analysis method discussed above is independent of the physical implementation of the pattern.

The latter can preferably be partially or completely transparent, so as not to disturb the primary visual information—as in a book, a map or an architectural plan—on the surface. In particular, the patterns may be applied using special inks or coatings that allow detection by the local sampling of physical parameters of the pixel elements of the above image raster—such as luminescence, electrical resistance, magnetization, dielectric constant, transmittivity and reflexivity under polarized or unpolarized light, thermal conductivity, mechanical compliance, light absorption, refractive index, electrochromic or thermochromic effects, as well as minute differences in the height of the coating. Luminescence herein denotes the emission of light by a material without any intervening thermal processes. Fluorescence (as in fluorescent security inks), phosphorescence, electroluminescence and triboluminescence, are relevant to the invention as examples of luminescence.

Such patterns may be combined in ad hoc fashion:
a) using physical effects that are different, especially measurable with different sensors on the same spot of the surface; thus, it is possible to measure, at a certain point, the electrical resistance of an ink without disturbing the sampling of the magnetization of a magnetic ink sitting underneath but on the same spot of the two-dimensional surface.
b) or using an ink printed, preferably by means of a variation of the corresponding color gradation or saturation, in such a way that locally variable values for the physical parameter to be sampled may be prescribed prior to printing (e.g. in a PostScript file) and sampled reliably after printing. In that case, two or more patterns may be combined. This is now discussed using an example of two patterns to be read out separately, M1 (e.g. consisting of vertical barcode stripes (22)) and M2 (e.g. consisting of horizontal barcode stripes (19)): in this case, it is sufficient to assign and measure three parameter values W1, W2 and W3, as follows:

| | |
|---|---|
| S = W1 | pattern M1 on this spot |
| S = W2 | pattern M2 on this spot |
| S = W3 | both patterns M1 and M2 on this spot | with S taking on a fourth value W0 ("zero") when there is no pattern sitting on this spot.

Now, at any point of a surface for which printing has been finished, one of the four values above corresponds to a value sampled at that spot by the reading device—e.g. to a sampled intensity of fluorescence or a surface resistance. If the reading device can discriminate between these four values with sufficient accuracy and consistency, it will be able to ascertain which pattern or combination of patterns has to be assigned to that particular spot on the surface.

Generalization to more than two patterns is obvious.
c) or two different inks are printed in a raster in such a way that the patterns overlap macroscopically but not microscopically.

2.1.2 Advantages of the Invention

As shown by the approximate calculations given for a specific example in Section 2.6, the invention permits rapid and precise reading of the positional coordinates of points on a surface, wherein such points are designated by a reading device; this may be compared to optical pens and other absolute position measurement devices applied to a computer monitor, or to a graphics tablet. However, the information carrier as used in the invention is directly sampled from the paper, without extraneous raster position-determining devices (and in particular without a monitor or a graphics tablet).

Preferred application examples are:
- flexible call of program processes according to 2.1.3 below.
- geometric measurement on the support or on a surface, for example an architectural design or a photo, done by setting the reading device on the corresponding points of the surface. To such purpose, it is not necessary to have the entire surface available; rather, that subset of the surface containing the two measurement points suffices. Concretely, for example, for distance measurements on a foldable map, at most, two pages need to be accessed in order to determine absolute coordinates in the entire artwork, e.g. in the form :<x,y>, with coordinates x and y pertaining to the position on the page (). In particular, distance and other measurements, to be conducted on an arbitrarily large surface, can limit themselves to consideration of only the relevant pages.
- virtual drawing or, using special inks, active drawing or writing on a surface; or capture of artwork on the surface by contouring. This occurs through periodic sampling of the reading device's position, analogous to a graphics tablet. In particular, the surface may be a blank page, so that the writer may be guided in order to learn writing—e.g. of Asian or other complex alphabets—faster.
- improvement in writing and signature recognition in pre-treated forms and print materials, through use of reading devices with automatic position recognition.
- simultaneous use of laser pointers or similar devices on a projection surface, so that arbitrarily many participants in a lecture can point at that surface simultaneously, with the positions being detected correctly for each participant.

In all these cases, the invention improves on the state of the art by doing away with the necessity to apply the information carrier to some fixed apparatus as in a graphic tablet or a magnetic-field position measurement device.

2.1.3 Calling Program Processes

The reading device can advantageously be equipped with one or more buttons, so that pressing a button will call a process either in the reading device itself, or in an external appliance that is connected to it either by wire or by wireless link, or by transfer of data using a physical carrier; wherein said process is always logically linked to the respective position that has been measured. For example, the primary information on the surface can be supplemented with a secondary information that has been stored in an external appliance linked by wireless or physical means to the reading device, and which may be called up therefrom.

The reading device can advantageously be equipped with an acoustic or visual display that signals to the user that the measuring point happens to be at a position in the surface to which such a computer process has been assigned, wherein such signaling may include a brief description of that process. This allows:

hypertext-like referencing, from a paper or other surface, into a keyword lexicon, another book etc., or into another spot of that surface which will be determined by absolute coordinates (or by specifying page and line); moreover, pointing to a position information that is stored in a suitable external device.

construction of arbitrarily large computer menus, implemented on paper as a plurality of visible icons, to which the above reading device may point and click. This allows a drastic flattening of a menu hierarchy and because such primary information and the overlapping position patterns can be printed using an inkjet printer, these menus can be changed very easily.

In particular, it is possible to build a universal reading device which, by wireless or wire link with a computer, will integrate all of the above functionalities.

2.2 Sample Embodiment of the Readout Method

The position determination using surface patterns printed on an information carrier or over surface will now be discussed. Point patterns can be used for such purpose provided that they meet the two criteria a) and b) below:

a) locality: the sensor in the reading device must see, in its entirety, at least one local surface pattern—e.g. consisting, as in FIG. 7, of the crosshair (35) and the points cluster (36), or as in FIG. 8 of the triangle (40*a*) and its gray-scale-coded content (40); so that the position measurement of points P (38), (39) according to point b) hereinbelow becomes possible locally. FIGS. 7 and 8 show examples where the points clusters (36), (40) are localized so strongly that they can be assigned to a characteristic geometric feature (38), (39)—which in this case is identical to P; moreover the points cluster (40) may be bounded by a machine-recognizable edge (40*a*) having a certain shape and thickness.

In these examples, FIG. 7 shows the point patterns (36) coding the coordinates of P in terms of vertical distances, and in FIG. 8 as a grayscale pattern (40).

b) local coding of absolute position of a geometric feature of respective point patterns By discussing the two embodiments in FIGS. 7 and 8, one can demonstrate the existence of point patterns for which, by 2-D image analysis methods and local processing of the picture pattern, the position of the above point P may be determined:

in FIG. 7 point P corresponds to the center of one of the crosshairs (interpreted as a set of points M)

as for the triangle in FIG. 8, several geometric features could be defined as M (edge, center of gravity, corners, etc.); standardization may yield agreement on a corner, for example, P could thus be assigned to the top corner point P's absolute position may be obtained through local image analysis, e.g. in FIG. 7 the crosshair can be interpreted as a coordinate system in which the ordinate of each local point in (36) codes a certain number of bits, which when strung together yield P's absolute coordinates. Alternatively in FIG. 8, those bits may be obtained through sampling the gray scales, based on a fixed raster (40*a*) inside the triangle.

Now, the position of measurement point K relative to P may be found by raster image analysis. In FIGS. 7 and 8 respectively, K is represented as a small pentagonal shape (37) and (41).

All these embodiments assume that the geometric characteristics and the algorithms that are necessary for such analysis have either been standardized or are made available (e.g. though reading a table of contents, or a repository of descriptions available in a reserved area of the surface) or externally (e.g. on external computer servers) before actual position measurement. Furthermore, it is assumed that enough of such point patterns are printed on the information support to make a position determination possible for any measurement point of the surface. This means that a reading device sitting on the surface must see at least one such point pattern in its entirety. Therefore, it is expedient to arrange the point patterns in a regular lattice: e.g. in FIG. 7 the local patterns would occupy a square lattice, in FIG. 8 it would consist of an array of triangles.

As a final remark, note that the patterns can be chosen so that even a local image analysis determines an unequivocal direction in the document; e.g. as in a crosshair pattern where the points would by definition sit in the top half, or as in a triangle (FIGS. 7 and 8). However, other patterns with a plurality of preferred directions may be used too, especially so if the orientation is clearly implicit in the primary information (e.g., as in a book, a map with a compass card).

2.3 Use of Two Lattices of Columns and Rows Crossed at Right Angles

By focusing on a preferred, special class of patterns, the image analysis per FIG. 7, 8 or 1 may be drastically simplified.

2.3.1 Use of Code Stripes for One-Dimensional Position Determination

In a preferred embodiment, the patterns discussed in Section 2.1 and in FIG. 1 can be realized as code stripes. Code stripes are defined as rectilinear stripes straddling the entire primary information that have an internal pattern that codes information. For example, these stripes may consist of straight lines of variable width that can be read out as bar codes (9). In the remainder of this description, an information carrier will be assumed onto which such code stripes are applied either horizontally or vertically, so that the uppermost or leftmost edge of each stripe can be assigned as its characteristic geometric feature, wherein "upper" and "left" are defined in terms of the way in which a user will hold a suitably marked reading device. This edge may be characterized by a line of a specific width.

For one particular code stripe, point P (8*a*) can now be interpreted as the intersection of a line segment—originating in K (15) and perpendicular to an edge (8) and that edge. It is now assumed that the information locally encoded into a pattern, embodied in the code stripe in the manner of a bar-code, will comprise in particular the absolute one-dimensional coordinate of P—in the convention above, its abscissa. Then, vector KP can be derived as detailed in 2.4.1 below.

For a group of parallel code stripes (6) or (9) and (11), it is equally possible to define—by convention—a point P (8a) by considering a line segment containing K (15) and intersecting those code stripes at right angles, wherein P is defined by the intersection of that segment with the first leftmost code stripe edge it encounters to its right, in that group. This can be defined algorithmically "find the distance between the measuring point and the leftmost edge of the next code stripe to the right". Use of a group of code stripes packed as tightly as possible that are themselves as narrow as possible, then allows position measurement using only a narrowly localized portion of the surface.

In the remainder of this description, a group of parallel code stripes arranged so that the distance between the leftmost edge of each code stripe to that of its predecessor or successor is a constant, will be referred to as a "one-dimensional lattice". This further simplifies the algorithms described in 2.4.1.

2.3.2 Use of Two One-Dimensional Lattices Crossing at Right Angles

Figure 2:
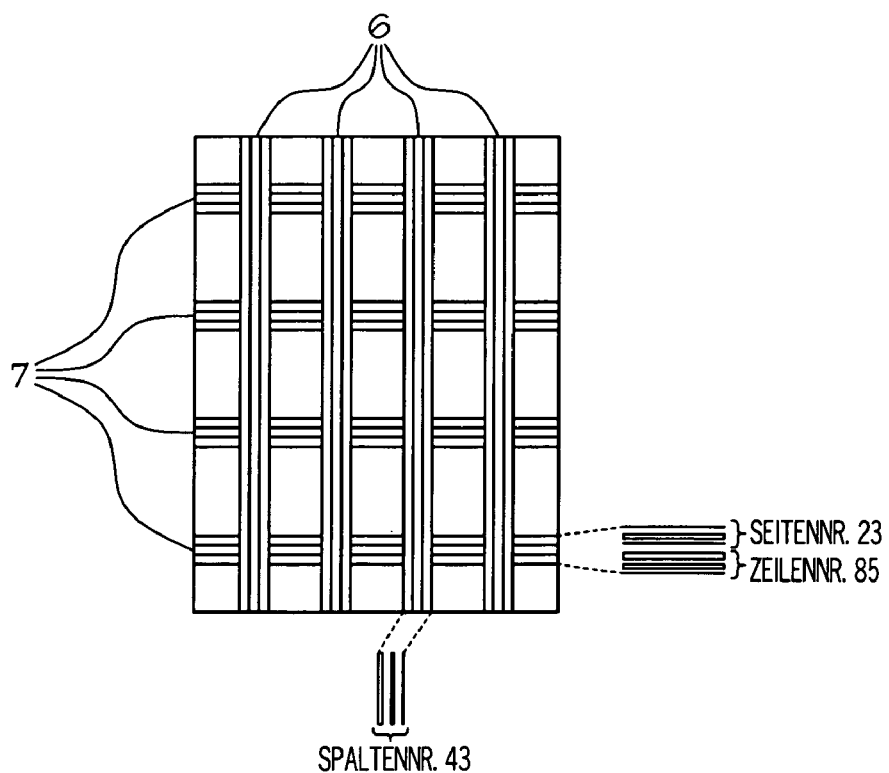
FIG. 2 illustrates a variant of the method depicted in FIG. 1, using simplified patterns implemented as crossed one-dimensional lattices of bar code stripes.

Two-dimensional position measurement is achieved by perpendicular crossing of two one-dimensional lattices as in FIG. 2, wherein by convention one lattice is assumed to be made of horizontal code stripes and hence the other of vertical ones; wherein the crossed patterns are printed using code stripes that are extended over the entire primary information, so that each pattern can be read out separately, either by one and the same sensor, or by different sensors, preferably using the entire width of a line sensor.

For a given measurement point K (23), the method now selects exactly two code stripes (22) and (19) such that their leftmost or uppermost edge is closest to K and it can thence, as discussed in section 2.4, find a position by processing a small portion of the artwork, in particular for arbitrarily large surfaces.

Extra patterns can be superimposed on the pattern combination described hereinabove, said extra patterns permitting a fine correction of a position that has been read. In a preferred embodiment, such patterns can fluoresce in their own spectrum and in 2.3.3 below, a suitable method is described.

2.3.3 Reading Device

The position is read by a device which samples a local raster on the surface and matches a physical pointer such as a crosshair to a measurement point on that raster.

Figure 5:
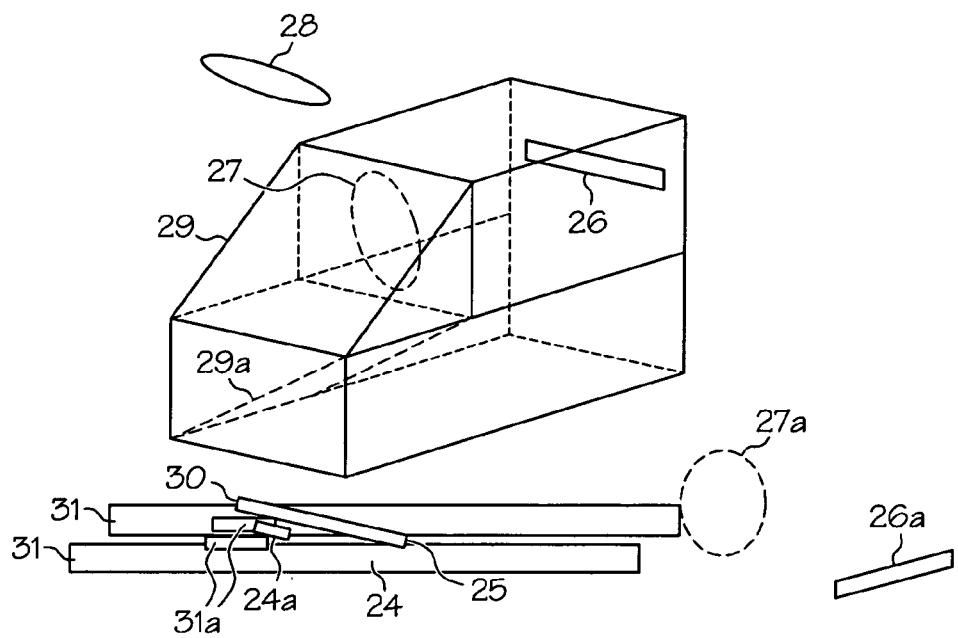
FIG. 5 illustrates an embodiment of an optical reading device with line camera(s).
Figure 6:
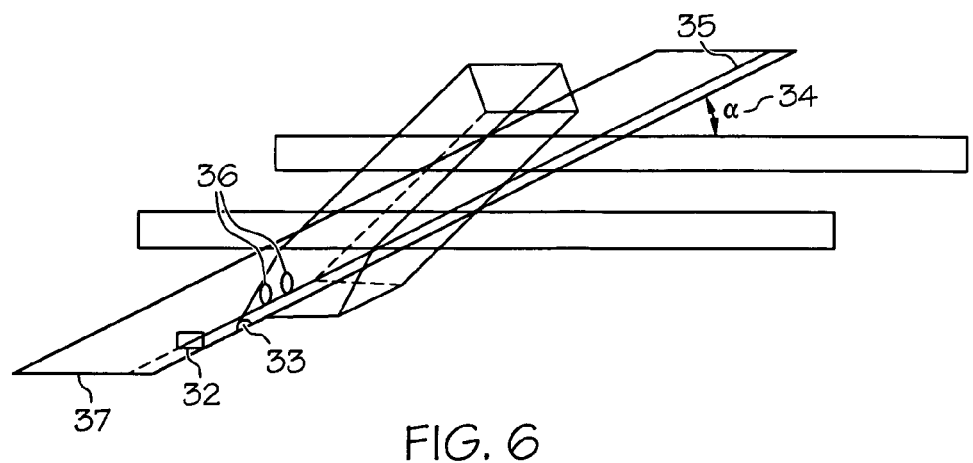
FIG. 6 illustrates additional use of an OCR scan pen for the position detection method described herein.

FIG. 5 shows an embodiment involving optical luminescence sampling. That reading device preferably uses excitation light which is shone from a source (28) through half-silvered mirrors (29), (29a) onto a section of the surface, said section being illuminated only by said source. The line raster (24) is bounded by two measurement points (30) and (25), and straddles a pair of code stripes (31) (the complementary pair that is perpendicular thereto is not shown here). In particular, where (24) overlaps the code stripes, said section illuminates in the visible spectrum and said luminescence is imaged by a camera lens (27) onto the line detector (26). Measurement on both points, (30) and (25), determines the absolute position of the reading device on the surface.

The fine correction mentioned in 2.3.2 above occurs by means of an additional, overlapping pattern (31a)—where again only one line pair has been drawn. This latter pattern is sampled by means of a smaller line raster (24a), through a half-silvered mirror (29a), which sees a much smaller section than (27) and using a lens (27a) and an additional sensor (26a).

Using two sets of lenses and sensors especially makes sense if these are mass market components with different focal lengths because the two sets of lenses and sensors will be much cheaper than one single high-resolution readout head.

2.4 Detailed Functional Description of an Embodiment

Figure 3:
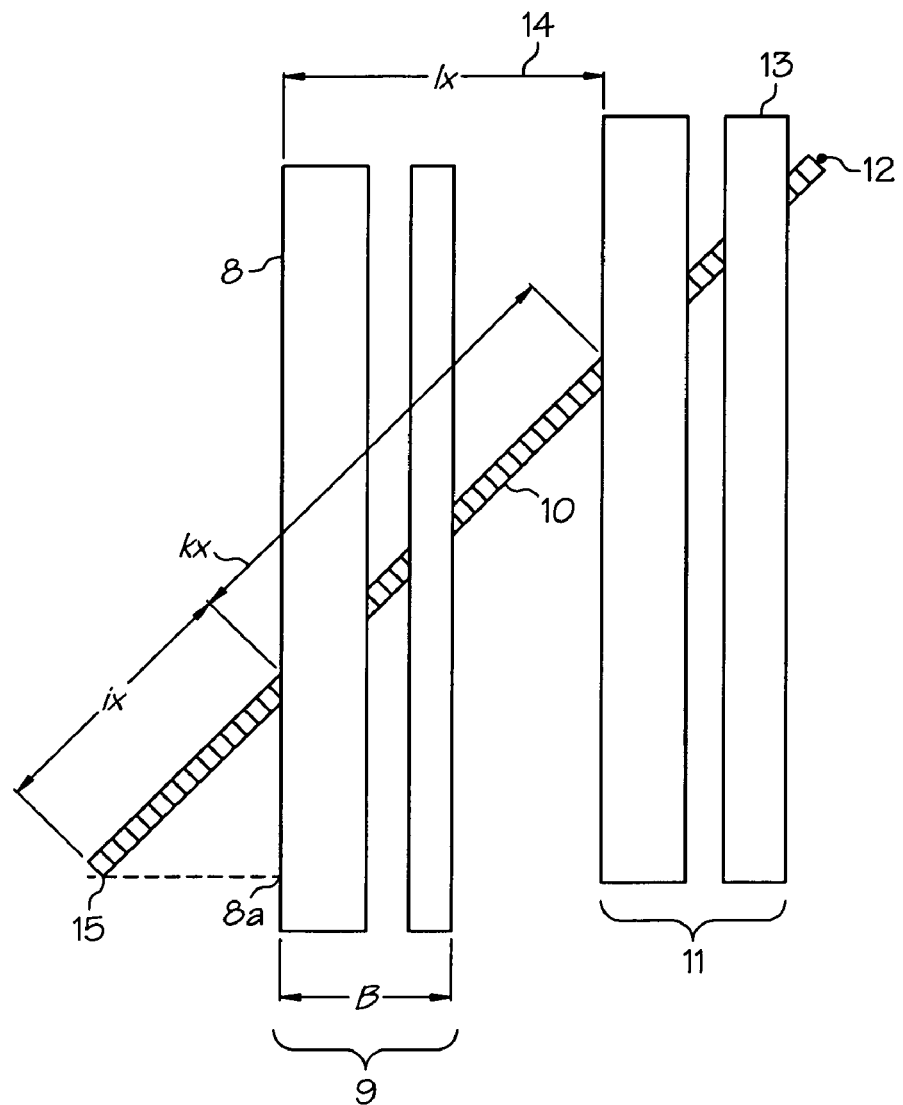
FIG. 3 illustrates details of the one-dimensional (horizontal) position determination using code stripe lattices per FIG. 2.
Figure 4:
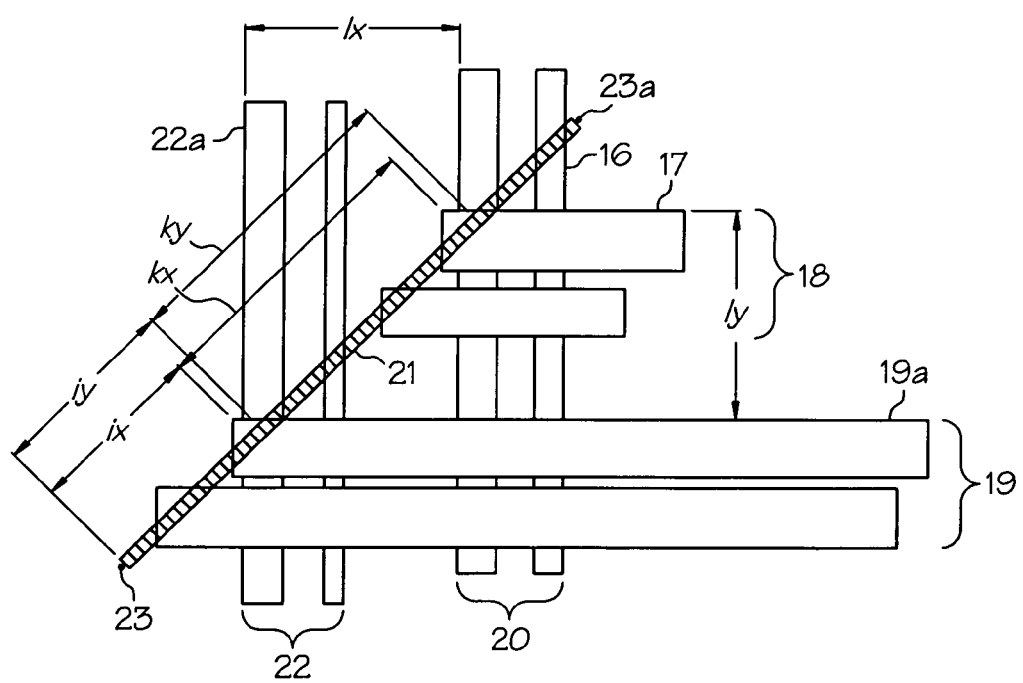
FIG. 4 illustrates details of the 2-dimensional position determination with crossed code stripe lattices per FIG. 2, each having different physical properties.

Referring to FIGS. 3 and 4, a detailed account of the method is now given for an embodiment determining a position on a plane paper page. Although it is assumed that such position measurement is carried out with an optical reading device as described in section 2.3.3, the discussion is independent of the physical means for detecting the lattice.

2.4.1 Position Determination in One Dimension

The determination of position is first discussed for a one-dimensional lattice Gx (9), (11) of vertical code stripes straddling the surface from the upper edge to the lower edge, each stripe having a maximum width B. Per FIG. 3, lx denotes the distance between the two leftmost edges of the code stripes, with lx>B. For the strongly simplified bar code stripes, (9) and (11), the width of each line code is exactly one digit and these code stripes thus stand for the values 42 and 43.

The horizontal coordinate of a code stripe is then determined by a number Nx:

$$Nx*lx \qquad (2.1)$$

with Nx*=0, 1, 2, 3 . . . and assuming that the very first code stripe is sitting at position number 0 on the surface (in a book or newspaper, this simplified example would entail numbering those code stripes in ascending order).

From this value, the horizontal position of a reading device on the surface can be determined. Let the sampled line raster (10) be bounded, on its left side, by measurement point (15), whose position is thus determined, and let that raster correspond, by geometric projection, to a CCD line in the line camera described in 2.3.3. Processing the pattern along that line element yields the horizontal coordinate X of measurement point (15):

a) a first step finds, by processing pixel brightnesses along that line segment, the next code stripe to the right and decodes its bar code pattern, giving the value Nx and thence, from formula (2.1), the absolute x-coordinate of the leftmost edge (8) of code stripe (9)

b) a second step determines the distance of the measuring point (15) to that edge. Line raster (10) is assumed long enough to always and reliably straddle two consecutive code stripes when its inclination angle α (13) is approximately 45 degrees. Let kx be the distance determined in this fashion. Then $$\sin(\alpha) = lx/kx \qquad (2.2)$$

Angle α can therefore be determined during the position measurement. Now let ix be the distance along the line segment sampled, from point (15) to the intersection (8) of that line segment with the code bar (9). Then, for the one-dimensional position X of measurement point (15) we have $$X = Nx*l - ix*\sin(\alpha) = Nx*lx - ix*lx/kx = (Nx - ix/kx)*lx \qquad (2.3)$$

The position of a second point (12) obtains from angle a and the length of the line raster. It may also be found from a formula similar to that in (2.3).

The precision and reliability of the measurement is determined by the following factors:

i) errors in determining Nx, i.e. when decoding the pattern in the code stripe ii) errors in determining ix and kx, caused during imaging and sampling the leftmost edge of the code stripe; these can arise from errors in optical imaging and from the finite resolution of the line detector; from the precision of the printing of the code stripes; and from aging changes in the sampled surface (through humidity, heat, mechanical stress etc.)

iii) erroneous value for lx, due to errors in printing and to subsequent changes in the surface as described above.

Errors in ii) and iii) can, in certain cases, be minimized by a simple calibration procedure outlined in section 2.5 below.

Because the value derived in formula (2.3) is independent of $\alpha$, it is only necessary that $\alpha$ be approximately 45 degrees and that value need only stay fixed during sampling. The value of about 45 degrees for $\alpha$ can be achieved, in the case of use of a manually operated reading device, with the help of simple markings on that reading device. But, since $\alpha$ is obtained through use of a formula (2.2) during the sampling process, it is possible to detect excessive deviations from the reference value of 45 degrees and to correct them:

for manually operated reading devices, the simplest scheme is an acoustic or visual display automatic reading devices can track the desired value for $\alpha$ through motion control of the sampling head

2.4.2 Determining a Position in Two Dimensions

In a preferred arrangement, let two lattices consisting of code bars Gy (18) and (19) and code bars Gx (22) and (20), be crossed at a right angle, as shown in FIG. 4.

We now discuss how the column numbers for the vertical code bars in Gx, and the row numbers for the horizontal code bars in Gy can be determined, simultaneously and separately, even for such parts of the surface where rows and columns overlap each other. This is discussed only for one measurement point (23). Again, and only by way of example, an optical method is assumed.

Preferred embodiments of the method use different security inks which will, under excitation by UV spectral line (centered at 380 nm for example) respectively fluoresce in distinct parts of the visible spectrum. For example, Gy may have a spectral band Sy—e.g. corresponding to the color green and Gx may have a spectral band Sx—e.g. corresponding to the color red; and each may be transparent in the visible spectrum, so that either will transmit the spectral bands Sy and Sx.

The line raster (21) may now be interpreted, as described in Section 2.4.1, as the image of a dual line detector in an electronic camera in the reading device, wherein that line detector is constructed from two adjacent but separate line detectors for "red" and "green", as in multicolor line detectors in high-end professional cameras and in commercial color scanners. Therefore, Gx and Gy may be sampled simultaneously.

One must now ensure that the UV light reaches both Gx and Gy and furthermore, that the luminescence light emanating from Gx and Gy actually reaches the sensor:

the simplest method to achieve this is to print Gx and Gy in the classical raster fashion known from color printing so that the print pixels for Gx and Gy never overlap. This assumes that every pixel in the line raster (21) contains a large number of print pixels luminescing in Sx and Sy.

as an alternative, assume that Gx is printed prior to Gy, both in unrastered fashion, so that the print pattern for Gy completely covers the one for Gx in certain locations. Such coverage area (17) in FIG. 4 is then hit by UV light which will let Gy luminesce in the red spectral band. The security ink for Gy partially absorbs the UV excitation light, which then hits the security ink for Gx, which is lying underneath, causing it to luminesce in a green color. However, the ink used for Gy is transparent in the latter (green) color domain and so, that luminescence emission reaches the sensor too. Now, normally Gx will luminesce more strongly in the area (16) as in the covered area (17), but as the interpretation of the patterns is digital, this effect can be eliminated by numeric thresholding.

A simultaneous readout of both lattices is also possible under other methods, e.g. wherein Gx and Gy are respectively detected through sampling a magnetization and a certain optical or thermal transmission property. Currently, this is achieved at high expense, but the latter is expected to drop rather rapidly as the miniaturization of sensors and the attached DSP electronics progresses.

In any case, formula (2.3) will apply equally to the detector line pertinent to Sx if one inserts the values sampled for ix, kx, and lx as well as the column number Nx. Therefore, from Section 2.3.1 above, the horizontal coordinate X of measurement point K (23) may be obtainsed as $$X = ix*\sin(\alpha) - Nx*lx = ix*l/k - Nx*l = (Nx - ix/kx)*lx \qquad (2.4)$$

Sampling in the spectral range Sy, the vertical coordinate Y of K may be obtained as $$Y = iy*\sin(\alpha) - Ny*ly = iy*l/k - Ny*l = (Ny - iy/ky)*ly \qquad (2.5)$$

Analogous formulae may be used to obtain the coordinates of a the second measurement point (23a) and since the position of the raster (21) on the surface is now unambiguously determined, the position of the reading device and hence that of a crosshair attached to that device can be determined unambiguously too.

2.5 Calibration of Reading Device on the Surface

Constants lx and ly may be fixed by industry standardization. However, more flexible solutions allow recovering them from the surface or from other tables of contents or directories. In either case, they are fixed when the surface is printed.

A surface—especially a paper surface—can shrink or expand; however, the actual values for lx and ly may be measured at any time and therefore, the values for ix, iy and kx, ky in formulae 2.4 and 2.5 can be corrected up to a point. A preferred solution for such purpose involves a visible graphical element (e.g. a crosshair), printed on the surface so that the arms of the cross are exactly perpendicular to the invisible code stripes per section 2.4. For text documents of a conventional layout, a horizontal line of text can be used as an approximation, for such calibration purpose. A calibration mark (e.g. a crosshair) is attached to the reading device. It is then possible to determine the two values lx and ly, by sampling along the detector line raster, in two sampling steps.

2.6 Estimation of Optical System Performance

This section discusses the performance of the method described hereinabove, based on the state of the art, and only considering optical readout variants, in order to document the suitability of this system for applications as discussed in section 2.1.2. Explicit quantitative assumptions are made for this purpose.

2.6.1 Precision of the Position Measurement

Major errors will be caused through faulty decoding of the code stripes, i.e. erroneous values for Nx and Ny. Based on classical barcode reading technology, which operates in environments far more hostile than the reading devices postulated here, as well as on plausible values (to be encoded in such barcodes) for Nx and Ny—such values normally having five or six digits—we may assume that code stripes of 1 cm width or less will be able to encode and reliably make available for readout the necessary information. Minor errors can occur in the local determination of distance of the measuring point to the respective code stripes and these are mainly caused by errors in printing, but also by errors in the optics, and by the finite resolution of the sensor.

A concrete discussion is now provided for a book page produced by high-end offset printing onto which crossed code stripes have been deposited, per FIG. 2.; somewhat less ambitious parameters would apply to newsprint. A printing process with an effective resolution of 1200 dpi is therefore assumed, i.e. resolving a maximum line width of 20μ.

a) let the crossed lattices be based on a square pattern, i.e. with a "lattice constant" ly=lx=l=9 mm and a code stripe width suitable for coding 5 digits (2 for row or column numbers, 2 for, respectively, two digits of the page number, 1 check number). For illustrative purposes, assume a bar code that will encode each of these five digits 0 <n<9 as a line of width (n+1)*p where each such line is followed by an empty interval of width p. That code stripe is now at most 55* p wide, i.e. about 6 mm, if we assume p=100μ.

b) let the dual color COD line detector have 4800 pixels, according to the state of the art for color scanners, and let that line be imaged on a line segment of 24 mm length on the surface, at an angle α=45 degrees (13). In this layout one sensor pixel will image onto a square—of the surface—of about 5μ width. Assuming ideal camera optics, the values for lx ix, and kx (and correspondingly ly and iy, ky in the y direction) can be determined with an accuracy of about two pixels or equivalently, 10μ, so that under the above idealized assumptions, an absolute positional accuracy of better than 100μ will be possible.

A number of approaches have been described that hold out the possibility of improving these values further.

2.6.2 Readout Speed

Common CCD line detectors will read out those rasters in milliseconds or less. CCD area detectors are slower, mass-market devices commonly reading out about 30 rasters/sec.

2.7 Generalization to Other Patterns and Reading Devices

We may expect further progress in printing, especially in inkjet printers, so that the dimensions considered under 2.6 could shrink even further. However, methods will be discussed below that hold out a promise of improvement under the existing state of the art. The enumeration that follows is meant to be non-exhaustive.

2.7.1 Variants and Improvements of Optical Sampling

2.7.1.1 Filtering Out Daylight or Extraneous Illumination

In situations where day—or other extraneous light can reach the part of the surface being sampled, the UV light source or any other effect causing luminescence can preferably be modulated in time, so that the patterns Gx and Gy may be recovered from analysis of the modulated luminescence signal.

2.7.1.2 Alternating Excitation Spectra

By using a color wheel or two different light sources, Gx and Gy may be excited in non-overlapping time intervals so that these patterns may be read out with a monochromatic sensor that is also time multiplexed, said sensor having, for example, in its CCD variant, a higher resolution than a color sensor of the same technology.

2.7.2 Readout with Circular Line Rasters

As an alternative to straight line segment rasters, circular rasters may be used to read out a pattern, for example, using a stepping motor to move a point sensor around an axis. In a preferred embodiment, a sampling circle (42) may be assumed on the surface, and subdivided, in a manner determined by the sensor, into a number of small segments of equal length, each corresponding to a sampling point. Starting from an arbitrary point Ω (51) on that circle, for all said segments the value of the parameter specific to the line pattern (e.g. its luminescence) is sampled, sequentially or in parallel for all segments. These values are entered into a table, one entry per segment.

The considerations that follow apply to the preferred use of stripe patterns as in FIGS. 2, 3 and 4. It is shown that the information encoded in these patterns as well as the distance from a characteristic feature of each stripe pattern to the center of the sampling circle may be found. This is now discussed using FIG. 9.

Let the sampling circle (42) be large enough to completely cut across the stripe pattern to be sampled. Then, for each stripe in that pattern, there exists a straight line (44) through point O (43) which is perpendicular to the stripe (45) to be sampled, and which crosses its edges at points M1 (46) and M2 (47). The sampling circle cuts the stripe along circular segments P1_P2 (48) and P3_P4 (49), with both segments being symmetrical with respect to line (44), so that they contain the same number of pixels. Now, segments (48) and (49) are connected by segment P2_P3 (50), which may or may not contain further segment pairs corresponding to other stripes. In that latter case, the stripe under consideration is the outermost stripe with respect to the center (43) and the distances O_M1 and O_M2 may be derived from elementary geometry. This procedure is then repeated for all stripes touched on by the sampling circle, so that in the end, the widths of all stripes and their distance to the center of the sampling circle have been found.

Figure 9:
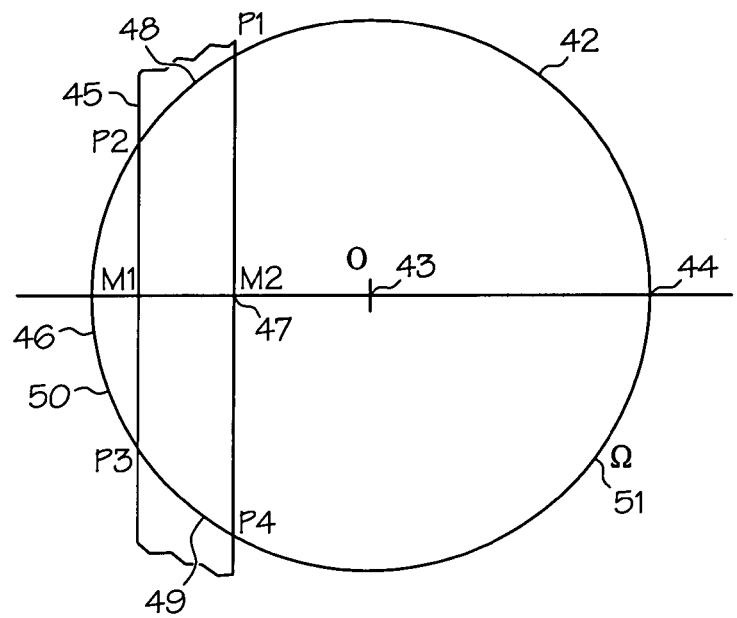
FIG. 9 illustrates a sampling circle for one embodiment of the invention.
Figure 10:
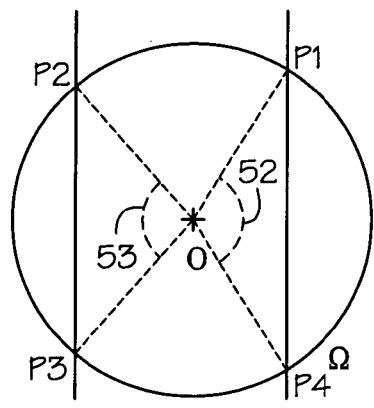
FIG. 10 illustrates a sampling circle in which the center of the sampling circle is contained in a stripe.
Figure 11:
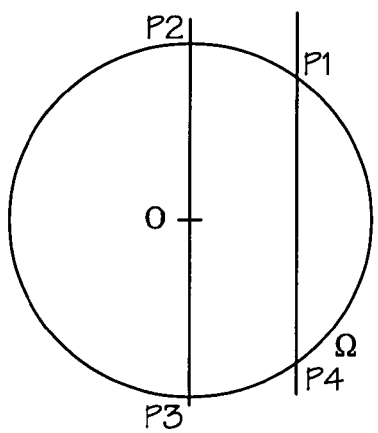
FIG. 11 illustrates a sampling circle in which one border of a stripe to be sampled traverses the center of the sampling circle.

FIGS. 10 and 11 show, respectively, degenerate cases of FIG. 9. In FIG. 11, one border of a stripe to be sampled traverses the center of the sampling circle; in FIG. 10 the center of the sampling circle is contained in a stripe. For these alternatives, the width of the stripe and its distance to the center of the sampling circle must be calculated differently. An analysis of the angles P1_O_P4 (52) and P2_O_P3 (53) will be used to decide which of the alternatives 9, 10, 11 applies. These angles can be calculated from the above table of values.

2.7.3 Reading Out Separate Line Rasters

Per Section 2.4.1 and considering a one-dimensional lattice Gx the method will not only determine the one-dimensional coordinate of the measuring point in the x direction but also that of the angle $\alpha$ relative to Gx. Assuming, therefore, a reading device capable of reading out two line rasters of the surface simultaneously, and further assuming that these two line rasters are in a fixed geometric relation to each other, then that measurement can yield, for one of the rasters, a coordinate in the x direction, and for the second raster, a coordinate in the y direction, so that from these two values the coordinates of K can be calculated.

This yields a design of a reading device featuring two line detectors that are offset relative to each other. Equally, one could use special image analysis algorithms for area raster detectors (as in a color area sensor, or a monochrome camera with a color wheel) so that many line pairs can be processed in one readout pass and that through averaging, a higher accuracy may obtain.

2.7.4 Other Codes and Patterns

Column numbers for Gx and row numbers for Gy may not only be coded as one-dimensional bar codes, but also as two-dimensional patterns that can be read out by electronic area sensor cameras; this particularly applies to other patterns per section 2.1 above. Equally, it is possible to print Gx and Gy using, respectively, a combination of inks, i.e. in multicolor mode. Position determination using these more elaborate coding schemes allows more reliable error correction and smaller patterns, at the expense of more complex hard- and software.

2.7.5 Mechanically Guided Scan Pens with Line or Area Detector

Optical position determination is also possible by sampling the surface with mechanically guided, enhanced OCR pens. The enhancement advantageously uses an additional UV light source in the pen so that the horizontal and vertical code stripes can be read out; and a color line detector per section 2.5 in the pen.

Two variants are conceivable for scan pens:
a) detector line sensor perpendicular to readout direction
i) if the line sensor has sufficiently high resolution, the pen may be fitted with a measurement mark and its line sensor then samples the pattern per FIG. 4. The pen must be operated in a special mode where it is pointed to the desired location on the surface.
ii) the pen is drawn across an area corresponding to a line raster (21), (24) on the surface. In order to relate this scan to a measurement point on the surface, the pen is preferably led by a rail (37), for example, using two wheels (36) running along said rail (35), where the measurement mark (32) is attached to said rail in such a fashion that it will trigger a switch consisting of a pair of contacts (33) when passing point (32).

b) however, the state of the art includes scan pens which use area sensors instead of line sensors and these are relevant to the detection using two-dimensional pixel rasters per section 2.2 as well as FIGS. 7, 8.

A scanning pen advantageously uses proven technology and holds out the promise of a dual device i.e. one that can determine position as well as performing OCR, especially on conventional surfaces that have not been enhanced in terms of the invention.

2.7.6 Mechanically Guided or Freely Held Point Reading Devices

Higher accuracies are possible using point (single-pixel) reading devices that are guided mechanically, or are used in freehand mode while sampling a line segment of the surface. In the domain of CD player technology, methods for readout that will involve spot widths of 1µ or less are state of the art.

2.8 Other Materials for Patterning

A number of other materials are available as an alternative to luminescent inks to print overlapping lattices Gx and Gy so that Gx and Gy can be read out separately, and these materials also can be applied using conventional printing or other methods, so that they can be read out with raster sensors of point reading devices as described in 2.7.5.

The prior art includes inks, colors or coatings that allow rastered sampling of the surface—using a pair of measurement points, or a line or an area detector for example, by local sampling of the luminescence, or the electrical resistance, or sampling of a voltage or a current, or of a dielectric constant or capacitance, or a thermal conductivity, or transmission or reflection of polarized or unpolarized light, or a refractive index, or a local elasticity module, or a magnetic field intensity or a magnetic resistance. In addition, patterns Gx and Gy can be printed using thermochromic or electrochromic inks and can therefore be detected by applying heat or a voltage. Moreover, patterns Gx and Gy may be detected by mechanical means.

2.9 Combination of Several Methods

The above scanning methods for one-dimensional or two-dimensional line rasters and in particular those mentioned in section 2.8, may advantageously be combined provided that such combination permits an independent readout of the crossed lattices.

The invention claimed is:
1. An information carrier, on which a position can be measured for a measuring point using a mobile reading device, wherein:
  the information carrier comprises a surface to which a visible primary information has been applied, in particular in the manner of sheet music, a book or a map,
  at least one machine-readable two-dimensional pattern has been printed on the surface, said two-dimensional pattern coding a position information, wherein by using said information in an image analysis method, and by local sampling of parts of the two-dimensional pattern, the position of measuring point may be determined
  the two-dimensional pattern coding the position information is transparent in such a way that the primary information on the surface will remain visible, and
  the two-dimensional pattern comprises two patterns realized as two crossed, overlapping but separately recognizable one dimensional lattices, Lattice_x made of horizontal code stripes and Lattice_y made of vertical code stripes, wherein the materials for Lattice_y and Lattice_x overlap in certain areas, but wherein said materials differ in their respective physical properties so as to permit separate readout and decoding of the two lattices at any point on the surface.

2. The information carrier according to claim 1, wherein the patterns are such that, upon finding a position for a measuring point on the surface, the reading device calls a program process corresponding to that position.

3. The information carrier according to claim 1, wherein patterns have been applied over the entire surface in such a way that for any location carrying a primary information, local processing of the patterns allows determination of a position at said location.

4. The information carrier according to claim 1, wherein said two patterns are printed on the surface such that they can be recognized by the reading device and discriminated between each other, and wherein the reading device can locally recognize, for each pattern, a characteristic feature and whose absolute position is coded into a pattern that can be locally decoded and interpreted, and wherein image analysis methods are used to determine the distance of measuring point to two or more of these characteristic features, so as to derive the absolute position of measuring point on the surface.

5. The information carrier according to claim 1, wherein patterns are printed such that, as a result of the printing process, or as a result of the materials that are used, these patterns can be read out by sampling a one- or two-dimensional raster on the surface.

6. The information carrier according to claim 1, wherein the one-dimensional distance of a measurement point to one of the characteristic features of a code stripe may be determined with a reading device that samples and processes a area or line raster that straddles the characteristic feature of at least two code stripes and which is positioned in a fixed relation relative to the measurement point.

7. The information carrier according to claim 1, wherein the reading device will detect Lattice_y and Lattice_x along a line or area raster on the surface, so that by a purely local position determination of the respective characteristic feature an absolute horizontal and vertical coordinate can be found for the measurement points and hence, the position of the reading device on the surface is determined.

8. The information carrier according to claim 7, wherein Lattice_y and Lattice_x are applied to the surface, using respectively different materials and using printing rasters in such a way that those materials do not overlap at any point of the surface and consequently can be read out separately.

9. The information carrier according to claim 1, wherein one or more patterns are luminescent, wherein the excitation light or effect is modulated so as to minimize the influence of extraneous light, and wherein each of the patterns being used luminesces in its own combination of spectral lines.

10. The information carrier according to claim 9, wherein the patterns partially overlap and can nevertheless be read out separately, particular wherein each pattern being used luminesces in its own combination of spectral lines in such a way that the respective luminescence light can be transmitted through all patterns that are laid on top of it.

11. The information carrier according to claim 9, wherein each printed pattern is excited in time-multiplexed fashion and in such a way, that the patterns may be read out in time alternating fashion and therefore separately.

12. The information carrier according to claim 1, carrying one or more patterns that are detected by sampling their electric resistance, magnetization, dielectric constant, transmittivity or reflexivity for polarized and unpolarized radiation, thermal conductivity, mechanical compliance, light absorption, refractive index, as well as absolute or relative differences in height between individual raster pixels and/or by exploiting their thermic or electrochromic properties.

13. A reading device capable of reading the first and second patterns on the document of claim 1.

14. A document having visible information and encoded positional information, said document comprising:
   a) a document surface;
   b) visible information applied on the document surface, said visible information being visibly discernable by the naked human eye;
   c) a first pattern applied on the document surface coincident with the visible information applied on the document surface, said first pattern being transparent to the naked human eye while not disturbing the discernability by the naked human eye of the visible information applied on the document surface, said first pattern comprising a plurality of parallel code stripes having encoded therein positional information on the document surface relative a first coordinate axis, said first pattern being applied with a varying saturation such that said parallel code stripes have different saturations; and
   d) a second pattern applied on the document surface coincident with the visible information applied on the document surface, said second pattern being transparent to the naked human eye while not disturbing the discernability by the naked human eye of the visible information applied on the document surface, said second pattern comprising a plurality of parallel code stripes having encoded therein positional information on the document surface relative a second coordinate axis, said second pattern being applied with a varying saturation such that said parallel code stripes have different saturations, the second coordinate axis crossing the first coordinate axis such that the first and second patterns create a lattice.

15. The document of claim 14, wherein the first and second patterns are applied over the visible information.

16. The document of claim 14, wherein at least one of the first or second patterns is applied with an ink or coating detectable by sampling a physical parameter.

17. The document of claim 16, wherein the first and second patterns are readable by sampling the physical parameter of electrical resistance.

18. The document of claim 14, wherein the code stripes have variable width.

19. A method for determining a position on a document, the document comprising visible information and transparent markings encoding positional information corresponding to a first coordinate axis and a second coordinate axis, the method comprising the steps of:
   a) sampling a plurality of physical parameter points on the document, each physical parameter point having one of nine physical parameter values such that the sampled points define a pattern, the nine parameter values respectively indicating:
      i) a transparent marking at a first saturation corresponding to the first coordinate axis,
      ii) a transparent marking at a second saturation corresponding to the first coordinate axis, iii) a transparent marking at a first saturation corresponding to the second coordinate axis,
iv) a transparent marking at a second saturation corresponding to the second coordinate axis,
v) a transparent marking at the first saturation corresponding to the first coordinate axis and a transparent marking at the first saturation corresponding to the second coordinate axis,
vi) a transparent marking at the second saturation corresponding to the first coordinate axis and a transparent marking at the first saturation corresponding to the second coordinate axis,
vii) a transparent marking at the first saturation corresponding to the first coordinate axis and a transparent marking at the second saturation corresponding to the second coordinate axis,
viii) a transparent marking at the second saturation corresponding to the first coordinate axis and a transparent marking at the second saturation corresponding to the second coordinate axis,
ix) no transparent marking; and
b) calculating a position on the document based on the sampled physical parameter points.

20. The method of claim 19, wherein the sampled points are a line having a starting point and an ending point.

21. A computer readable medium comprising instructions to perform the method of claim 19.

22. A reading device capable of performing the method of claim 19.

* * * * *